Figure 1:
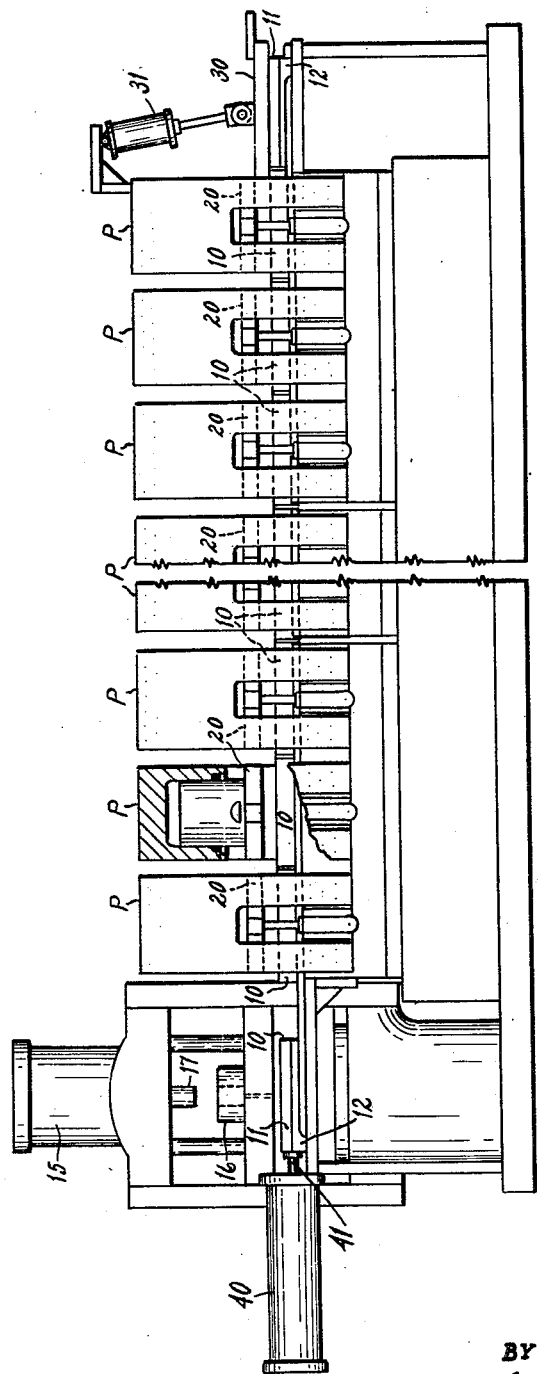

Jan. 2, 1951

C. H. BEARE 2,536,120

METHOD OF MOLDING COMPOUNDS WHICH
CURE UNDER HEAT AND PRESSURE

Filed Nov. 26, 1947

2 Sheets-Sheet 1

INVENTOR
CHARLES H. BEARE
BY
Spencer Hardman & Fehr
his attys.

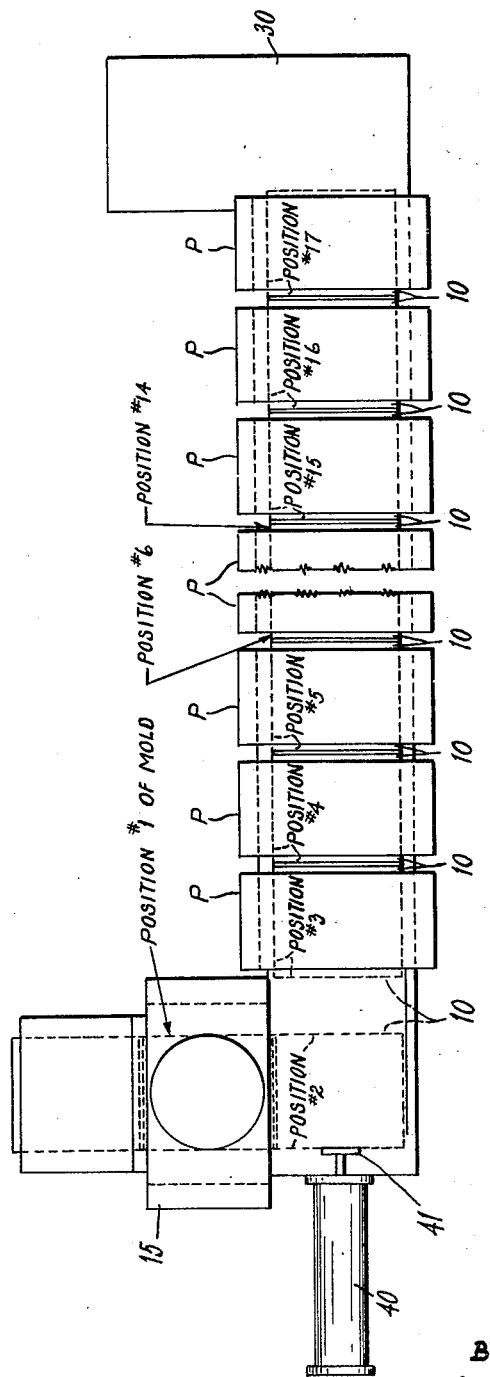

Patented Jan. 2, 1951

2,536,120

UNITED STATES PATENT OFFICE 2,536,120

METHOD OF MOLDING COMPOUNDS WHICH CURE UNDER HEAT AND PRESSURE

Charles H. Beare, Dayton, Ohio, assignor to General Motors Corporation, Detroit, Mich., a corporation of Delaware Application November 26, 1947, Serial No. 788,320

3 Claims. (Cl. 18—55)

This invention relates to a method of molding articles from a compound which is cured under heat and pressure, such as vulcanizable plastic rubber compounds and the like.

An object of the invention is to provide improved methods of molding such articles having one or more of the following advantages. The molded articles will be more uniformly compacted and have greater strength than when molded by methods heretofore known and in general use. The molded material will more completely fill the narrowest crevices of the mold cavities and hence provide more uniformly perfect molded articles. The final molded articles will be less subject to blow holes, surface blisters, or similar imperfections. A less expensive molding compound is permissible since a greater percentage of filler materials may be added to the compound and still provide adequate strength and hardness in the final molded articles. The total elapsed time of curing required for a predetermined degree of cure will be shortened, with resultant economies.

An important feature of the method of this invention is the intermittent relief, during curing of the molded material, of the external pressure which normally maintains the molds closed. Such periods of pressure relief greatly facilitate the emergence and escape of the gases which are formed in the material in the process of curing and the successive reapplications of the pressure on the mold in effect provides compacting blows thereupon.

The teachings of this invention may be applied by those skilled in the art to various moldable materials which set and harden under heat and pressure, and when any of various known methods of filling the mold cavities is employed. This invention is particularly advantageous when the molds are filled by the injection method, that is, when the plastic compound is forced at high pressure into the cavity of the closed mold by means of an injection press or the like. With the injection method of filling the mold cavities there is often difficulty in getting an even distribution of the compound thruout the mold cavity. This difficulty is more pronounced with molding materials which do not flow readily under the available or permissible pressure and heat, and of course further depends upon the intricacy of the shape of the mold cavity itself and the smallness of the passages therein thru which the material must flow. In general, the less flowable the moldable plastic compound is and the more intricate the shape of the mold cavity, the harder it is to provide a reasonably even distribution of the material in the mold cavity. By the methods of this invention such difficulties are entirely overcome or at least greatly reduced so as to permit the injection method of filling molds in cases not otherwise possible or practical. By the method of this invention the material being molded is given a succession of intermittent pressure relief and compacting strokes during its cure by intermittently relieving and reapplying the external force which normally holds the parts of the divided mold closed.

In the drawings:

Fig. 1 is a diagrammatic side elevation of a large apparatus suitable for molding hard rubber steering wheels according to the methods of this invention. The line of hydraulic-operated vulcanizing presses is shown broken at the central portion to indicate omission of similar presses in this line. The upper platens of all the curing presses are shown in raised position.

Fig. 2 is a diagrammatic plan view of the apparatus of Fig. 1.

Reference numeral 15 designates the large hydraulic-operated injection press for filling the divided molds 10 when said molds are located between the holding platens which hold the two halves 11 and 12 of each mold 10 closed while its mold cavity is being filled by injection under high pressure with a suitable plastic rubber compound. 16 designates the high pressure injection cylinder and 17 the injection piston therefor. After each mold is filled by injection press 15 the holding platens are released to remove the external force holding the mold halves closed, and thereupon the mold is passed from position #1 (see Fig. 2) to position #2. Each mold 10 remains in position #2 for a predetermined period, herein termed the "breathing dwell," during which the highly compressed injected material in the cavity expands by slightly lifting the weight of the top half 11 of the divided mold 10.

From position #2 each filled mold 10 enters the line of vulcanizing presses P and is indexed successively thru positions Nos. 3, 4, 5 etc. and finally out of the last vulcanizing press P to the unloading station 30. Assuming that there are 15 presses P in the series, then the first curing step occurs at position #3 and the last curing step at position #17 (as such positions are indicated in Fig. 2). The power means for pushing molds 10 from position #2 to position #3, and to index all molds successively from position to position thru the line of curing presses P is indicated by the suitably long power cylinder 40 and its plunger 41. The travel of plunger 41 is sufficient to close the gap between the two molds in positions Nos. 2 and 3 and thereafter push the mold in position #2 to position #3. Since molds 10 are arranged to mutually contact one another along the line of presses P, as the mold in position #2 is pushed to position #3 it also advances all other molds in the line one position and pushes the mold in the final press P to the unloading station 30, all simply by sliding the molds 10 from platen to platen of the presses P along a horizontal plane. Thus the power plunger 41 can index all the molds 10 simultaneously within a period of only several seconds while the closing force upon the molds is relieved by raising the platens 20 of all the curing presses P at the same time. A power operated mold-opening device is diagrammatically shown at 31 in Fig. 1 which automatically separates the mold halves 11 and 12 after each mold 10 reaches the unloading station 30, and automatically removes the fully vulcanized molded rubber article.

As an illustrative example, one way of practicing this invention in molding hard rubber automobile steering wheels will now be described. A series of about fifteen large vulcanizing hydraulic presses are arranged very close together in a line so that the separate divided molds in which the steering wheels are molded can be readily and quickly passed from one press to the next press in the line, preferably by sliding the individual molds horizontally from platen to platen of the adjacent presses. At one end of the line of presses there is arranged a large hydraulic injection press with suitable mechanism for injecting thru a suitable injection nozzle at high pressure the plastic rubber compound to fill the mold cavities of the separate molds one after the other. Preferably each mold contains only one cavity for molding one steering wheel. A reinforcing metal skeleton comprising a hub, a rim ring, and three or four spokes connecting the rim ring to the hub is normally provided as a metal insert for the molded material of the wheel. This skeleton insert is properly located in the mold cavity by fixing the metal hub in place in the mold so that the rim ring lies approximately at the center line of the molded rim, and the metal spokes lie approximately at the center lines of the molded spokes. If necessary small locating pins may be provided in the mold to positively locate the metal rim ring and/or spoke reinforcing members approximately on said center lines. A suitable rubber compound is injected into the mold cavity at the hub, preferably thru four or five runners, and flows radially outward thru the several spoke cavities and thence around thru the rim cavity to fill the entire mold cavity.

During the filling of each mold by the injection press the two halves of the divided mold are held tightly closed by the platens of the injection press to retain the material being injected. Preferably, after such filling, the external pressure upon the divided mold is relieved for a dwell of about one minute, which allows the mold to "breathe" and during which the injected material in the mold cavity expands slightly by lifting the weight of the top half of the divided mold by about one-eighth of an inch. This one minute "breathing dwell" permits the injected material to more readily flow from the maximum pressure localities in the cavity to the minimum pressure localities therein due to the slight separation of the mold halves, and so greatly facilitates an even distribution and density of the material within the mold cavity.

After such filling and "breathing," each mold enters the line of 15 vulcanizing presses each of which holds the mold closed in the usual manner and applies the usual temperature suitable for vulcanizing hard rubber thereto from its heated platens for about one minute, after which the vulcanizing presses are all opened for a period of about 6 seconds. During these six second periods each mold is relieved of external closing pressure thereupon and is passed on to the next vulcanizing press in the line of presses, preferably simply by sliding the molds from platen to platen of the presses on a horizontal plane. This progression continues thru the fifteen presses, each press providing a heat and pressure cure of about one minute, which gives a total of 15 minutes pressure cure upon each mold and 14 periodic breaks in pressure of about six seconds each. An ordinary temperature for vulcanizing hard rubber steering wheels may be around 335° F. and such a temperature may be used with the above method. When the mold emerges from the fifteenth press the mold is opened and the fully cured hard rubber steering wheel removed therefrom. This opening and removal may be done automatically by well-known power devices if so desired.

The empty molds may be returned successively by a suitable conveyor to the injection press at the opposite end of the line of 15 presses, where another metal reinforcing wheel skeleton is inserted in each mold (after proper cleaning of the mold cavity) and the molds are again successively filled with compound by the injection press and the cycle is repeated, as described above. Or, preferably, the 15 vulcanizing presses are each provided with suitably arranged platens so as to simultaneously apply vulcanizing heat and pressure to two molds, one above the other, at each closing of the presses and a similar mold-filling injection press is arranged at each end of the line of presses. In such an arrangement the molds are each passed from press to press successively in one direction on one level to complete the vulcanizing cycle during their passage thru the presses in that one direction, and are then cleaned and after having a new wheel skeleton inserted in each mold they are successively refilled with compound by the second injection press and passed from press to press in the opposite direction on a second level to complete another vulcanizing cycle during their passage thru the presses in said opposite direction.

All fifteen presses are closed at the same time, and also opened at the same time for the recurring six second periods of pressure relief upon the molds during which the successive molds are advanced from press to press. This means that when using the above one minute pressure periods and six second pressure relief periods a newly filled mold enters the line of presses at one end thereof every sixty-six seconds, allowing six seconds for the filled mold to be slipped between the platens of the first press. If the operation of the injection press is coordinated with the opening and closing of the fifteen vulcanizing presses, as is preferable, this allows an aggregate time of sixty-six seconds for each mold to be filled by the injection press and then have an initial "breathing dwell" without external pressure thereupon for about one minute. This aggregate time of sixty-six seconds for injection filling plus "breathing" of each mold may be divided as desired to give best results with the particular compound being used at the time. For instance, it may be found preferable to use ten seconds, or even one fourth or one half of this aggregate time, for the injection filling of the mold and the remainder of such time for the "breathing dwell", dependent upon the flowing characteristics of the particular compound being injected and the degree of resistance to flow the particular mold cavity presents.

It is to be understood that in practicing the methods of this invention, the number of the fifteen pressure curing periods described above is merely typical for molding hard rubber parts, but this number is not critical and may be varied as desired, either more or less than fifteen, to give best results with the particular compound being molded. The aggregate time length of all the pressure periods plus the relief periods should be such as will properly complete the cure of the molded articles during the entire cycle. Also the length of the six second periods of pressure relief upon the molds is not critical and may be increased or decreased within reasonable limits, say from three seconds to twelve seconds, to give adequate time for the escape of the gases accumulated in the material during the pressure periods dependent upon the particular compound being molded. The pressure relief periods ordinarily are only so long as may be required practically to move the mold from one curing press to the next succeeding press when a series of presses are used rather than only one curing press. Other compounds than vulcanizable hard or soft rubber compounds may be molded by the methods of this invention, for instance, compounds which set and harden under heat and pressure such as compounds using phenol-formaldehyde or other synthetic resins as a binder and which give off considerable gas during the curing process.

While the embodiment of the present invention as herein disclosed, constitutes a preferred form, it is to be understood that other forms might be adopted, all coming within the scope of the claims which follow.

What is claimed is as follows:

1. The steps in a continuous method of molding articles from a vulcanizable plastic rubber compound, comprising: filling the mold cavities of a series of divided molds by injecting the rubber compound thereinto while retaining said divided molds substantially closed by an external force, relieving said external force upon each mold of said series to permit the injected material to expand by partially opening the mold halves and thereby facilitate a more uniform distribution of the material thruout the mold cavity, then passing the filled molds one after another thru a series of vulcanizing presses each of which compacts the material in each mold by forcing the mold halves together and applies curing heat and pressure to advance the vulcanization of the material being molded, each mold being permitted to break due to removal of external pressure thereupon while it is being passed from one press to the next press of said series, said successive compacting and curing steps being continued until the material is permanently set by vulcanization.

2. In a continuous method of making vulcanized rubber articles, the steps comprising: successively squirting a plastic uncured rubber compound thru an injection orifice to fill each mold cavity of a series of molds while said molds are each held closed by an external force as they pass successively thru a holding press, immediately relieving the external closing force upon each mold for a period of the order of one half to one minute to permit the injected compound to expand and facilitate equalization of its distribution thruout the mold cavity, then intermittently vulcanizing the injected compound under heat and pressure by passing the filled molds one after another thru a series of vulcanizing presses until the rubber compound is permanently set by vulcanization, all of said vulcanizing presses being periodically opened and closed at the same time and all the molds being advanced simultaneously from press to press while said presses are open, each mold being free to be opened slightly by expansion of the partially vulcanized compound therein while said mold is being advanced from press to press, said vulcanizing presses successively providing compacting strokes upon the expanded partially vulcanized compound in each mold.

3. In a method of molding articles from a plastic compound which sets and hardens under heat and pressure, the steps comprising: squirting the uncured plastic compound through an injection orifice into the mold cavity of a divided mold while maintaining the mold closed by an external force thereupon, then relieving said closing force upon said mold for a period of the order of one half to one minute to permit the injected compound to flow and more nearly equalize its density thruout the mold cavity, then closing the mold and applying heat thereto to cure the injected compound under heat and pressure, the closing force upon said mold being intermittently relieved during the cure to permit the partially cured compound to intermittently readjust uniformity of its density thruout the mold cavity by more freely expanding from the maximum internal pressure localities to minimum internal pressure localities, each said intermittent readjustment being immediately followed by a closing of the mold to provide a series of compacting strokes upon the compound while it is being cured, the intermittent periods of relief from the external closing force upon the mold being utilized to bodily transfer the mold from one press to a succeeding press.

CHARLES H. BEARE.

REFERENCES CITED

The following references are of record in the file of this patent:

UNITED STATES PATENTS

| Number | Name | Date |
|---|---|---|
| 1,979,246 | Bast | Nov. 6, 1934 |
| 1,997,074 | Novotny | Apr. 9, 1935 |
| 2,027,165 | Grubman | Jan. 7, 1936 |
| 2,215,244 | Linzell | Sept. 17, 1940 |

OTHER REFERENCES

Plastic Mold Eng., by DuBois et al., 1946, page 266.